April 9, 1963 F. T. INNES 3,085,225

CHARACTER RECOGNITION

Filed Jan. 21, 1960 2 Sheets-Sheet 1

INVENTOR.
FRANK T. INNES
BY Laurence R. Brown

INVENTOR.
FRANK T. INNES
BY Laurence R. Brown

United States Patent Office 3,085,225

Patented Apr. 9, 1963

3,085,225

CHARACTER RECOGNITION

Frank T. Innes, Malvern, Pa., assignor, by mesne assignments, to Drexel Dynamics Corporation, Philadelphia, Pa., a corporation of Pennsylvania Filed Jan. 21, 1960, Ser. No. 3,857
2 Claims. (Cl. 340—146.3)

Figure 1:
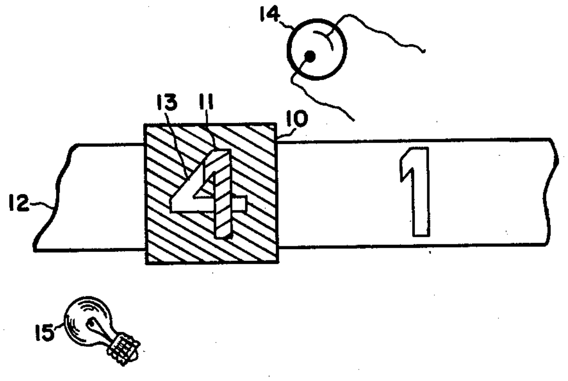

This invention relates to character recognition and, more particularly, it relates to character detection means and methods in automatic reading systems.

In systems for automatic reading of characters, difficulty exists in distinguishing between characters having similar characteristics to such an extent that signal differences between a desired selection and a desired rejection become marginal.

It is, therefore, an object of this invention to provide improved distinction between different characters without changing character size or shape.

In accordance with this invention, characters which present similar characteristics with normal recognition processes are detected by simple logical means. Thus, different messages are detected and a logical "and" operation is made to assure the proper combination of signals to distinguish one of two characters otherwise presenting similar signals.

Figure 2:
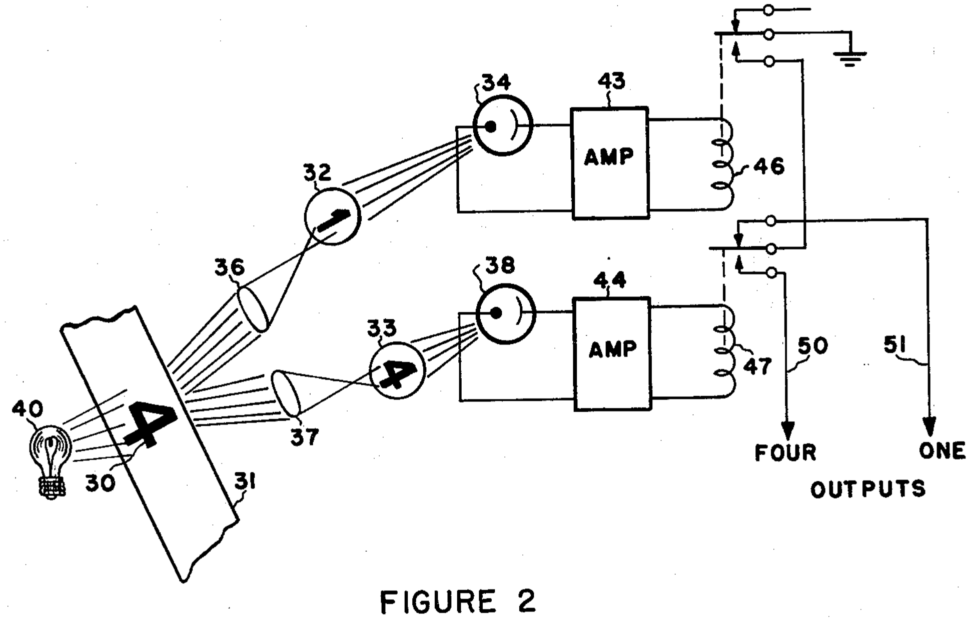
Figure 3:
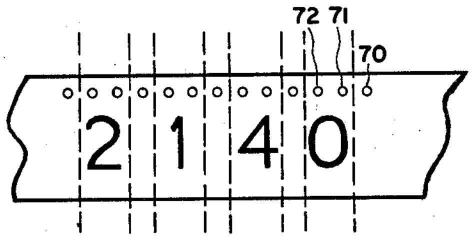
Figure 4:
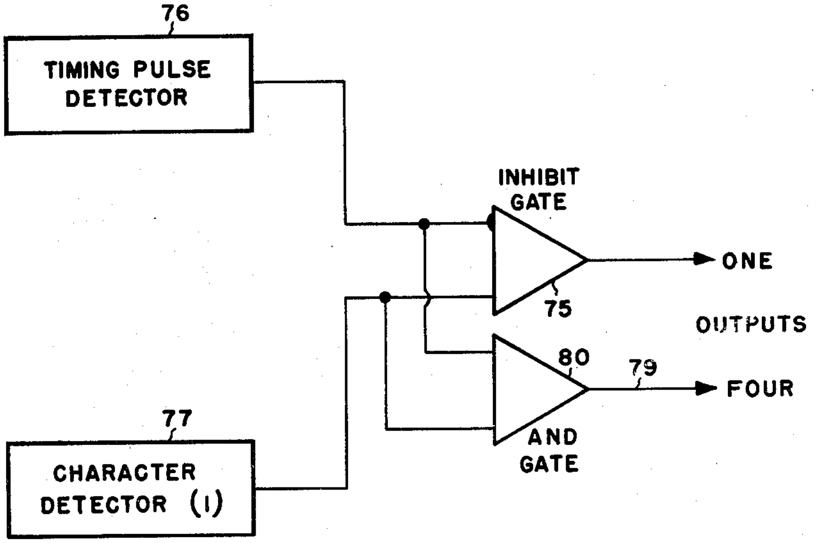

The objects and features of this invention are more apparent from consideration of the drawing, in which:

FIGURE 1 depicts similarities between two characters as evidenced in a map comparison character selection system, and FIGURE 2 is a diagrammatic presentation of a logical network for distinguishing between two characters presenting similar signals, and FIGURE 3 is a diagrammatic view of a series of characters on a carrier strip, and FIGURE 4 is a block diagram of a logical network for distinguishing between two characters.

It may be seen from FIGURE 1 that, in a reading field 10, a mask is presented with a transparent map section 11 signifying a character 1. When the opaque character 4 is presented at 13 for comparison, as by pulling the transparent carrier strip 12 across the reading field 10, in substantial registration with the mask, it is seen that the 4 completely blocks out the character 1. Thus, it is difficult to distinguish between the two characters by a null at photocell 14 caused by cutting off light transmitted from lamp 15.

It is desirable in many cases to retain the standard features and shapes of the characters while providing means to detect the differences between the characters.

To distinguish between the two representative characters 1 and 4 presenting similar signals, the logical circuit shown in FIGURE 2 may be used. The basic principle of character detection illustrated is the map comparison method wherein the character 30 presented on the carrier strip 31 is compared with images 32 and 33. Thus, a null will occur upon corresponding photocells 34 and 38 when a match is made. As the character 4 is presented, it may be seen that the character will be registered by lenses 36 and 37 for comparison at both map display images 32 and 33.

The lamp 40 supplies light for the system to produce excitation of photocells 34 and 38 unless the map images 1 and 4 are matched. As evidenced in FIGURE 1, the character 4 will register with both the character maps 32 and 33 to cause a null on both photocells 34 and 38.

Signals may be amplified at circuits 43 and 44 to drive relays 46 and 47. Assume that the relays have contacts shown in non-actuated position so long as light passes through maps 32 and 33 to excite photocells 34 and 38.

Then, as the character 1 is selected, relay 46 is operated and an output signal (ground) is supplied to terminal lead 51. Should the character 4 be selected, both relays 46 and 47 are operated and the output signal appears at terminal lead 50. Therefore, the relay contacts are connected to logically choose the correct number, by providing a logical "and" operation for obtaining the four output with an "inhibit" operation for disconnecting the one output.

Extension of the logical selection principle may be made to the timing track or sprocket signal embodiment sketched in FIGURE 3. In this embodiment timing signals 70, 71, and 72 are supplied, wherein the set of three signals identify a character and a space. This is a zone allocation system where each character is divided into right and left portions by timing signals 71 and 72 respectively.

Again, considering discrimination between a 1 and a 4 by means of a simple logical operation evidenced in FIGURE 4, it may be seen that the common portions may be distinguished by presence or absence of a timing pulse. Thus, a 1 signal has no simultaneous timing pulse, whereas the similar area of the 4 coincides with a timing signal. The selected one output signal therefore is inhibited at gate 75 by timing pulses read from the sprocket track by detector circuit 76, while true 1 characters are passed.

A four output signal is produced at lead 79 by way of "and" circuit 80 to permit selection with only two detection circuits for the two characters.

It is evident, therefore, that, with the map comparison method of reading characters, a minimum of simple basic logic selections may be used to permit significant leeway in selection of unique signals without requiring special character shapes or complex logical selection methods. Having thus improved the state of the art, those features of novelty are defined with particularity in the appended claims.

I claim:

1. In a character recognition system, means for distinguishing between first and second characters having configurations which are different yet sufficiently similar that the first may be contained within the second, said distinguishing means comprising: a first pattern area comprising a background having thereon a first character, said background and character having substantially different light transmissive properties; a second pattern area comprising a background having thereon a second character, said background and second character having substantially different light transmissive properties, the light transmissive properties of each of said backgrounds and characters being respectively similar; a reading station having a source of light; means for presenting the character to be recognized at said reading station; lens means for focusing light from said source, as modified by said character being read, on said first and second pattern areas simultaneously; first light-responsive means responsive to a null of light passing through said first pattern area for developing a first electrical signal; second light-responsive means responsive to a null of light passing through said second pattern area for developing a second electrical signal; first relay means coupled to said first light-responsive device and having switch contacts responsive to said first electrical signal for developing an output signal in a first output circuit unless inhibited; and second relay means coupled to said second light-responsive device and having switch contacts connected in series with said first relay switch contacts for developing an output signal in a second output circuit and for inhibiting an output signal from said first output circuit in response to the combined presence of both said first and second electrical signals.

2. In a character recognition system, means for distinguishing between the first and second characters which are different yet sufficiently similar in configuration that the first may be contained within the second, said distinguishing means comprising: a first pattern area opaque except for a transparency of said first character; a second pattern area opaque except for a transparency of said second character; a reading station having a light source; means for presenting the character to be recognized at said reading station; lens means for focusing light from said light source as modified by said character to be recognized on both said first and second pattern areas simultaneously; first photocell means responsive to a null of light passing through said first pattern area for developing a first electrical signal; second photocell means responsive to a null of light passing through said second pattern area for developing a second electrical signal; first relay means coupled to said first photocell and having its switch contacts actuable in response to said first electrical signal for developing an output signal in a first output circuit unless inhibited; and second relay means coupled with said second photocell and having switch contacts connected in series with the contacts of said first relay means for developing an output to a second output circuit and for inhibiting an output from said first output circuit in response to the combined presence of both said first and second electrical signals.

References Cited in the file of this patent

UNITED STATES PATENTS 2,919,425 Ress et al. ............... Dec. 29, 1959